US010153582B2

(12) United States Patent
Sato et al.

(10) Patent No.: US 10,153,582 B2
(45) Date of Patent: Dec. 11, 2018

(54) WIRE COVER FOR CONNECTOR

(71) Applicants: Yazaki Corporation, Minato-ku, Tokyo (JP); AISIN AW CO., LTD., Anjo-shi, Aichi (JP)

(72) Inventors: Akira Sato, Makinohara (JP); Teruo Kato, Anjo (JP); Yusuke Hinoda, Anjo (JP)

(73) Assignees: YAZAKI CORPORATION, Minato-ku, Tokyo (JP); AISIN AW CO., LTD., Anjo-shi, Aichi (JP)

( * ) Notice: Subject to any disclaimer, the term of this patent is extended or adjusted under 35 U.S.C. 154(b) by 0 days.

(21) Appl. No.: 15/774,050

(22) PCT Filed: Dec. 7, 2016

(86) PCT No.: PCT/JP2016/086440

§ 371 (c)(1),
(2) Date: May 7, 2018

(87) PCT Pub. No.: WO2017/099148

PCT Pub. Date: Jun. 15, 2017

(65) Prior Publication Data

US 2018/0323536 A1 Nov. 8, 2018

(30) Foreign Application Priority Data

Dec. 11, 2015 (JP) ................................ 2015-241790

(51) Int. Cl.
*H01R 13/52* (2006.01)
*H01R 13/58* (2006.01)
(Continued)

(52) U.S. Cl.
CPC ........... *H01R 13/58* (2013.01); *H01R 13/502* (2013.01); *H01R 13/5213* (2013.01); *H01R 13/447* (2013.01); *H01R 13/629* (2013.01)

(58) Field of Classification Search
CPC ... H01R 13/5213; H01R 13/567; H01R 13/58
See application file for complete search history.

(56) References Cited

U.S. PATENT DOCUMENTS 4,195,899 A * 4/1980 Radloff ............. H01R 13/5812 439/468
5,480,312 A * 1/1996 Watanabe ........... H01R 13/443 439/135
(Continued)

FOREIGN PATENT DOCUMENTS

JP 11086957 A 3/1999
JP 2002343497 A 11/2002
(Continued)

OTHER PUBLICATIONS

International Search Report, issued by International Searching Authority in corresponding International Application No. PCT/JP2016/086440, dated Jan. 17, 2017.
(Continued)

*Primary Examiner* — Briggitte R Hammond
(74) *Attorney, Agent, or Firm* — Sughrue Mion, PLLC

(57) ABSTRACT

A wire cover includes a hood top surface, a first hood side surface and a second hood side surface. A hood side notched groove is formed in the first hood side surface so as to be notched from a tip edge toward a base end of the first hood side surface while leaving the base end. A hood side deficient portion is formed in the second hood side surface. The hood side deficient portion is deficient extending from a tip edge to a base end of the second hood side surface. A hood top surface deficient portion is formed in the hood top surface and is partially deficient of the hood top surface positioned near the second hood side surface. The hood top surface deficient portion is adjacent to the hood side deficient portion.

4 Claims, 14 Drawing Sheets

(51) Int. Cl.

| | |
|---|---|
| ***H01R 13/502*** | (2006.01) |
| *H01R 13/447* | (2006.01) |
| *H01R 13/629* | (2006.01) |

(56) References Cited

U.S. PATENT DOCUMENTS

| | | | | |
|---|---|---|---|---|
| 5,564,953 A * | 10/1996 | Endo | H01R 13/4368 | 439/701 |
| 5,735,702 A * | 4/1998 | Hio | H01R 13/516 | 439/157 |
| 5,897,392 A * | 4/1999 | Takahashi | B60R 16/0215 | 429/121 |
| 5,967,830 A * | 10/1999 | Tsuji | H01R 13/506 | 439/467 |
| 6,155,884 A * | 12/2000 | Sugiyama | H01R 13/516 | 439/701 |
| 6,817,888 B2 * | 11/2004 | Kozono | H01R 13/62933 | 439/468 |
| 7,494,376 B1 * | 2/2009 | Foltz | H01R 13/567 | 439/596 |
| 7,559,778 B2 * | 7/2009 | Pittenger | H01R 13/62955 | 439/157 |
| 8,043,111 B2 * | 10/2011 | Takahashi | F16L 25/0045 | 174/72 A |
| 8,480,417 B2 * | 7/2013 | Suemitsu | H01R 13/46 | 439/157 |
| 9,178,302 B2 * | 11/2015 | Suemitsu | H01R 13/56 | |
| 9,837,756 B2 * | 12/2017 | Toyoda | H01R 13/567 | |
| 2002/0170736 A1 | 11/2002 | Yamashita et al. | | |
| 2008/0280467 A1 * | 11/2008 | Tsuji | H01R 13/4223 | 439/135 |
| 2013/0122728 A1 | 5/2013 | Kobayashi et al. | | |

FOREIGN PATENT DOCUMENTS

| | | |
|---|---|---|
| JP | 3154848 U | 10/2009 |
| JP | 2010055863 A | 3/2010 |
| JP | 201228011 A | 2/2012 |

OTHER PUBLICATIONS

Written Opinion issued by the International Searching Authority in corresponding International Application No. PCT/JP2016/086440, dated Jan. 17, 2017.

* cited by examiner

WIRE COVER FOR CONNECTOR

TECHNICAL FIELD

The present invention relates to a wire cover for a connector, and particularly to a wire cover for a connector which is attached to the connector and restricts a lead-out direction of a wire led out from the connector.

BACKGROUND ART

In the related art, there is disclosed an invention of an electric-wire cover (is the same as "wire cover") which restricts a lead-out direction of electric wires (is the same as a "wire") led out from a connector, and in which an electric-wire fixing portion having an approximate door shape in cross-sectional view is projected from a hole edge of an electric wire outlet of the electric-wire cover, and a pair of insertion holes into which a binding band to bind the wires can be inserted are provided in the electric-wire fixing portion (for example, see Patent Document 1).

PRIOR ART DOCUMENT

Patent Document

Patent Document 1: JP-A-2002-343497 (Pages 2 to 3, FIG. 1)

SUMMARY OF THE INVENTION

Problems that the Invention is to Solve

In the invention disclosed in Patent Document 1, a winding path (that is, an insertion hole through which the binding band passes) of the binding band can be appropriately selected according to the number and an outer diameter of the electric wires. Therefore, the binding band passing through the insertion hole selected according to the number and the outer diameter of the led-out electric wires can fix the electric wires to a fixing portion according to the number and the outer diameter of the electric wires.

However, in the case of binding a binding band which includes a band portion and a head portion having a band binding hole through which the band portion passes in an undetachable manner, there is a need to insert the band portion through the insertion hole, and to insert the band portion into the band binding hole. Therefore, there is a problem that a mounting work is complicated.

When the binding band is bound (that is, the band portion is inserted to the band binding hole and fastened), a binding work becomes unstable because there is no portion to press the head portion, and thus workability to bind the binding band becomes worse. In a case where the binding band is insufficiently fastened, the electric wire cannot be fixed securely to the electric-wire fixing portion.

The invention has been made in view of the above problems, and an object thereof is to provide a wire cover for a connector which can bind a binding band easily and stably, and sufficiently fasten the binding band so as to securely fix an electric wire to the electric-wire cover.

Means for Solving the Problem

According to the invention, there is provided a wire cover for a connector which is configured to attached to the connector, and guides a wire led out from the connector in a wire lead-out direction.

The wire cover for the connector includes:

a hood top surface which faces the led-out wire, and a first hood side surface and a second hood side surface which extended from the hood top surface toward the connector in a direction substantially parallel to the wire lead-out direction, wherein a hood side notched groove is formed in the first hood side surface so as to be notched from a tip edge positioned in an extending direction of the first hood side surface toward a base end of the first hood side surface while leaving the base end;

wherein a hood side deficient portion is formed in the second hood side surface, the hood side deficient portion is deficient extending from a tip edge positioned in an extending direction of the second hood side surface to a base end of the second hood side surface, and wherein a hood top surface deficient portion is formed in the hood top surface and is partially deficient of the hood top surface positioned near the second hood side surface, and the hood top surface deficient portion being adjacent to the hood side deficient portion.

In the wire cover according to the invention, in the hood top surface, a hood top surface rib is formed in a surface being opposite side to a surface facing the wire along a direction crossing the wire lead-out direction.

In the wire cover according to the invention, the hood top surface and the second hood side surface are formed to surround the hood side deficient portion and the hood top deficient portion, and the hood side notched groove and the hood side deficient portion are formed to face each other.

The wire cover according to the invention further includes:

a binding band which includes a flexible band portion, and a head portion having a binding hole through which the band portion passes in an undetachable manner, wherein the band portion is guided to the hood side notched groove, and passes through the hood side deficient portion and the hood top deficient portion; and wherein the head portion abuts on a periphery of the hood side notched groove.

Advantage of the Invention (a) According to the invention, a binding band which includes a band portion and a head portion is mounted to a connector in a state where a part of the band portion is guided to a hood side notched groove, and passes through a hood side deficient portion and a hood top deficient portion. Therefore, the mounting is easy, and a mounting work of the binding band is made with speed.

(b) The band portion can be fastened by pressing the head portion to the periphery of the hood side notched groove of the first hood side surface. Therefore, the binding band is prevented from being deviated, a fastening work of the binding band is stable, and the wire is securely fixed to the wire cover by the sufficiently fastened binding band.

(c) The band portion is flexible, and passes through the hood side notched groove, the hood side deficient portion, and the hood top deficient portion to directly abuts on the wire. Therefore, the wire is securely fixed to the wire cover by the binding band without being affected by the number of wires to be led out.

(d) Since the band portion of the binding band passes through the hood side deficient portion and the hood top deficient portion, the band portion of the binding band is settled at a position near the first hood side surface, and thus does not protrude from the second hood side surface in the opposite direction to the first hood side surface. Therefore, a space having no protruding stuff is formed along the second hood side surface.

MODE FOR CARRYING OUT THE INVENTION

First Embodiment

Hereinafter, a mode (hereinafter, referred to as "first embodiment") for carrying out the invention will be described with reference to the drawings. The invention is not limited to the embodiment of the drawings. In order to avoid that the drawings become complex, descriptions of some parts or some symbols are omitted in some cases.

(Connector)

Figure 1:
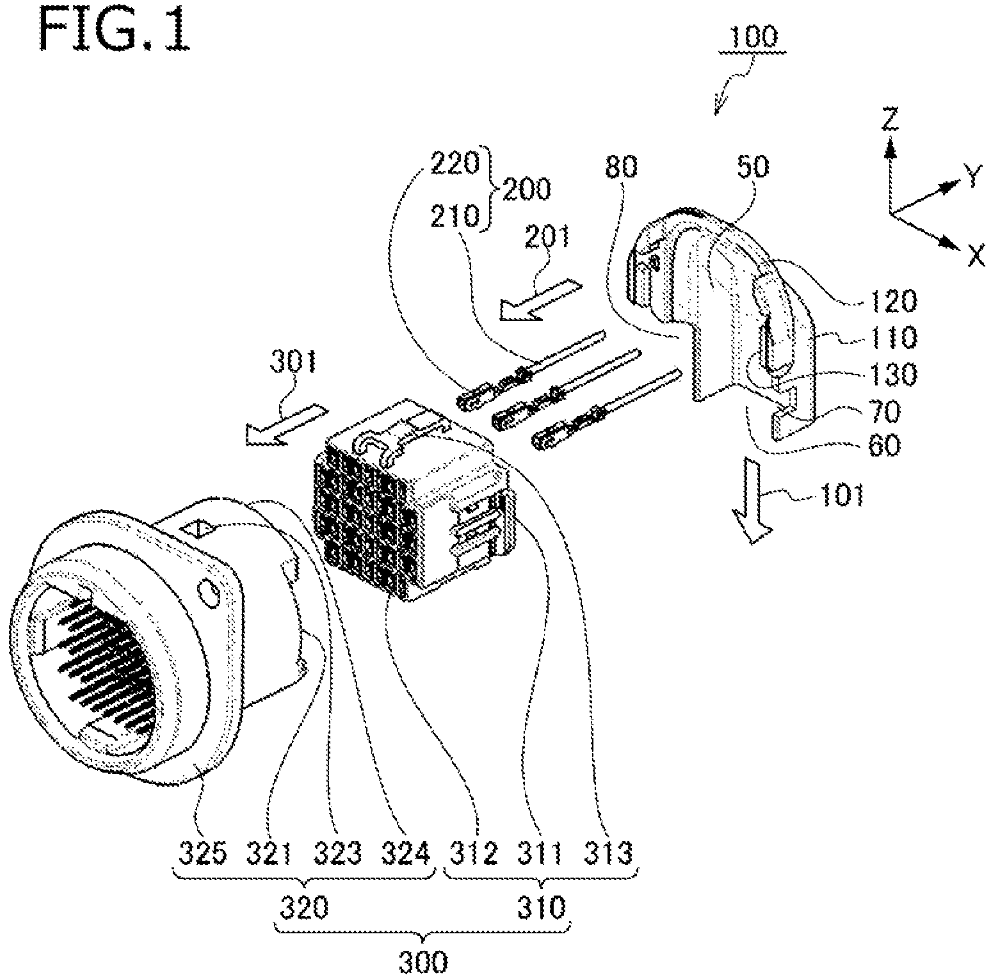
FIG. 1 is a perspective view for describing a wire cover for a connector according to a first embodiment of the invention in which a mounting target member (such as a connector) is separated.
Figure 2:
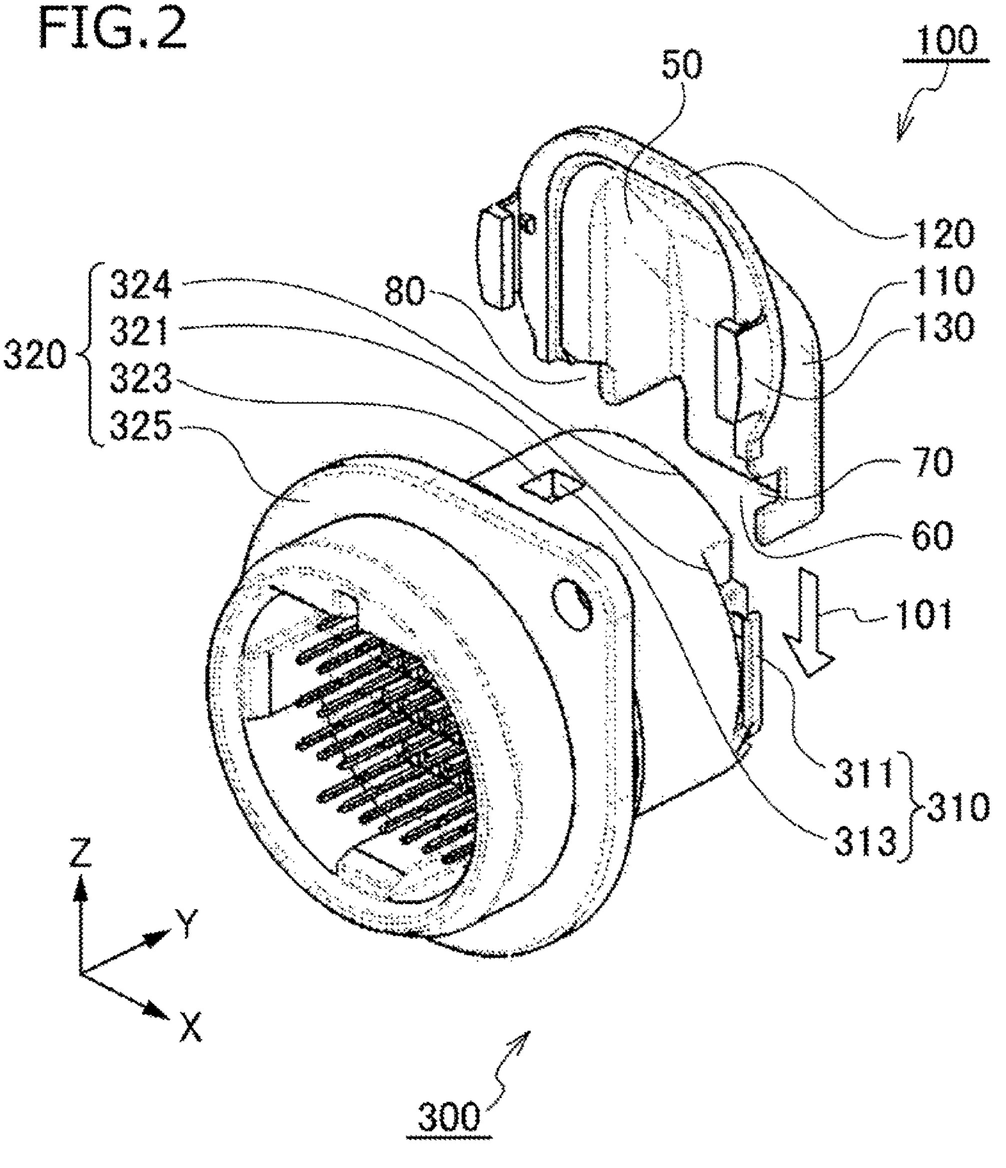
FIG. 2 is a perspective view for describing the wire cover for a connector according to the first embodiment of the invention, illustrating a process where the wire cover is mounted to a mounting target member (such as a connector).

FIGS. 1 and 2 are views for describing a wire cover for a connector according to the first embodiment of the invention. FIG. 1 is a perspective view in which a mounting target member (such as a connector) is separated, and FIG. 2 is a perspective view for describing a process where the wire cover is mounted to a mounting target member (such as a connector).

In FIGS. 1 and 2, a wire cover for a connector (hereinafter, referred to as "wire cover") 100 is attached to a connector 300.

The connector 300 is configured by a female connector housing 310, and a male connector housing 320 which stores the female connector housing 310.

A connector terminal 200 is inserted into the female connector housing 310.

The connector terminal 200 includes a wire 210, and a crimp terminal 220 which is installed at a tip of the wire 210, and the wire 210 extending from the connector terminal 200 is disposed along a lead-out direction (depicted by a thick arrow, and hereinafter referred to as "wire lead-out direction") 101 of the wire 210 while being restricted by the wire cover 100.

For the convenience of explanation below, the opposite direction to the direction (depicted by a thick arrow, and hereinafter referred to as "connector terminal insertion direction") 201 of inserting the connector terminal 200 into the female connector housing 310, that is, the opposite direction to the direction (depicted by a thick arrow, and hereinafter referred to as "housing insertion direction") 301 of inserting the female connector housing 310 into the male connector housing 320 is referred to as "Y direction".

The opposite direction to the wire lead-out direction 101 is referred to as "Z direction", and a direction perpendicular to the Y direction and the Z direction is referred to as "X direction". Incidentally, the wire lead-out direction 101 is the same as the direction of mounting the wire cover 100 to the female connector housing 310.

(Female Connector Housing)

The female connector housing 310 has almost a cuboid shape, and is provided with a plurality of connector terminal storage chambers 312. The connector terminal 200 is inserted into each of the connector terminal storage chambers 312. A positioning projection 311 is formed to protrude in each of a pair of outer surfaces (a surface in the X direction and a surface in the −X direction) facing each other, and a locking projection 313 is formed to protrude movably forward and backward in the outer surface (a surface in the Z direction) where no positioning projection 311 is formed.

(Male Connector Housing)

The male connector housing 320 has almost a cylindrical shape provided with a flanged male connector flange 325 which protrudes to the outer surface, and is provided with a storage portion (not illustrated) where the female connector housing 310 is stored.

A positioning groove 321 into which the positioning projection 311 of the female connector housing 310 is intruded is formed in each position (a position in the X direction and a position in the −X direction) facing the outer surface. A locking hole 323 to which the locking projection 313 of the female connector housing 310 is locked is formed at a position (a position in the Z direction) perpendicular to a virtual line connecting the positioning grooves 321.

(Wire Cover)

Figure 3:
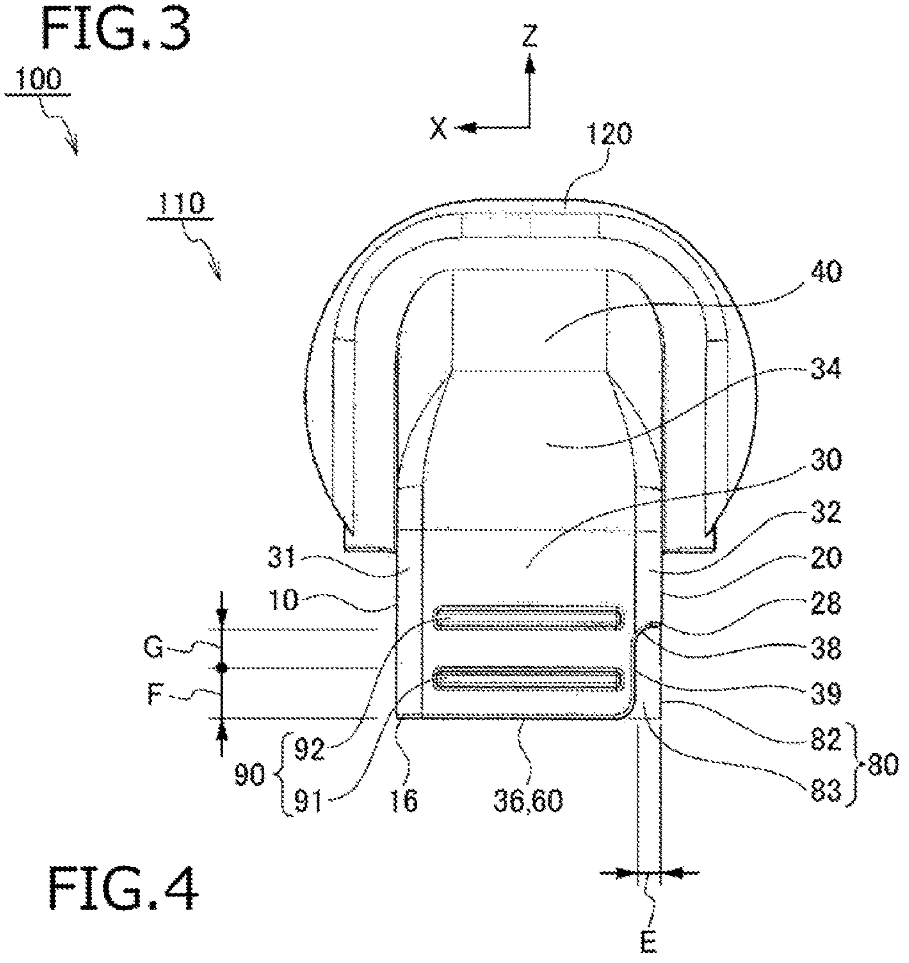
FIG. 3 is a plan view for describing the wire cover for a connector according to the first embodiment of the invention.
Figure 4:
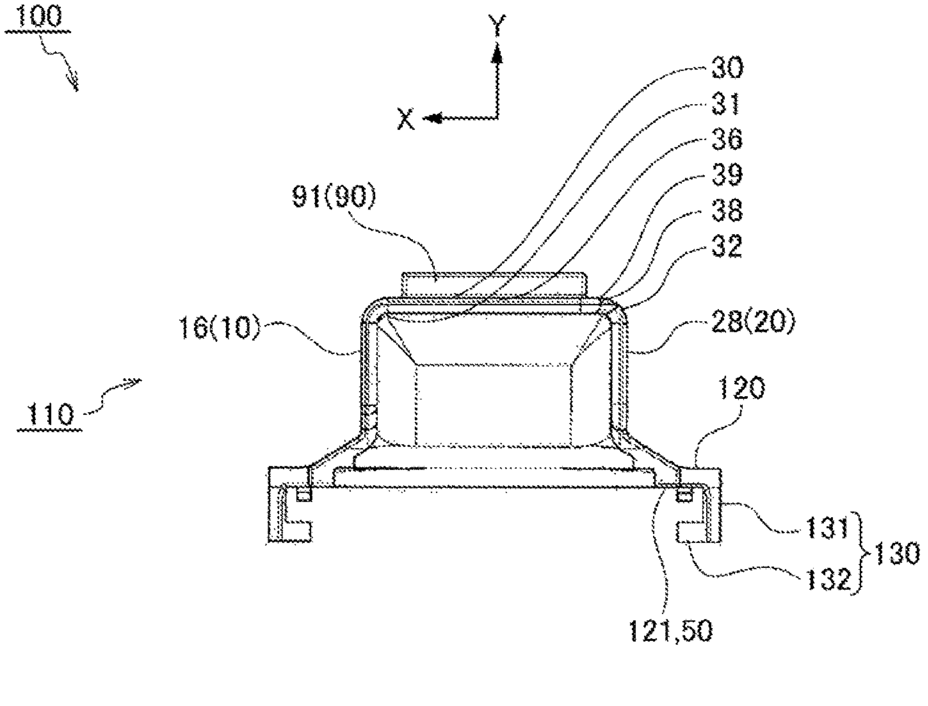
FIG. 4 is a front view for describing the wire cover for a connector according to the first embodiment of the invention.
Figure 5:
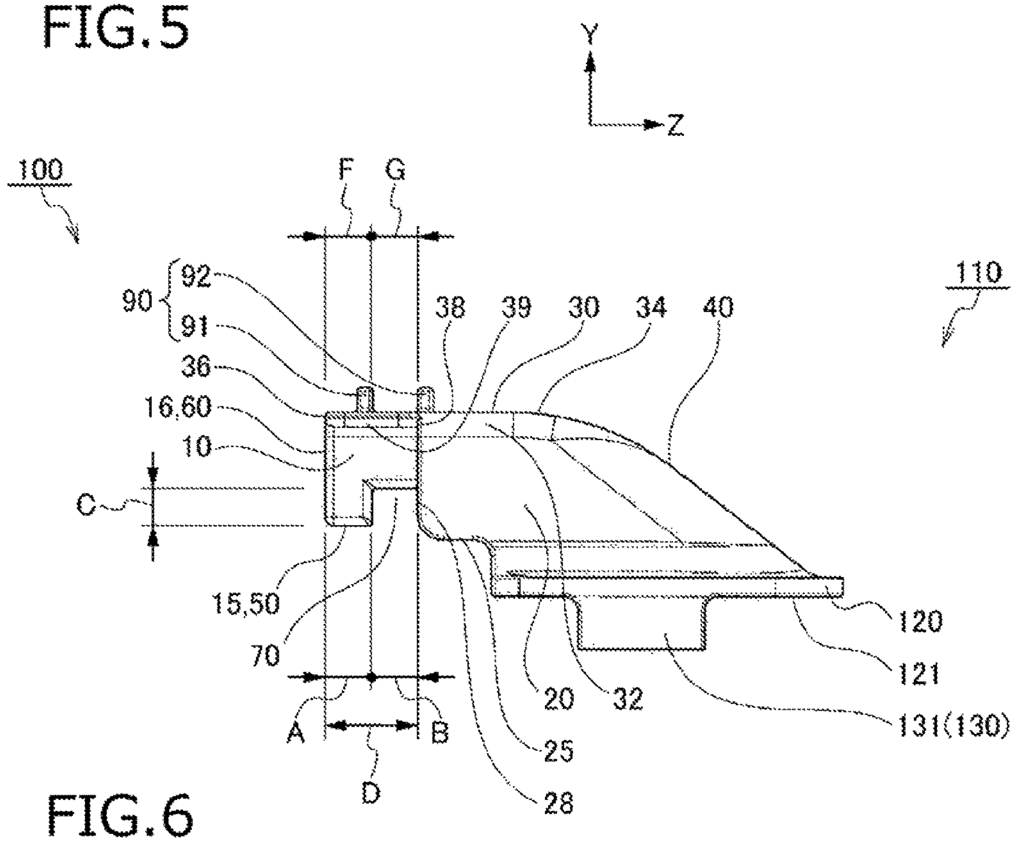
FIG. 5 is a side view for describing the wire cover for a connector according to the first embodiment of the invention.
Figure 6:
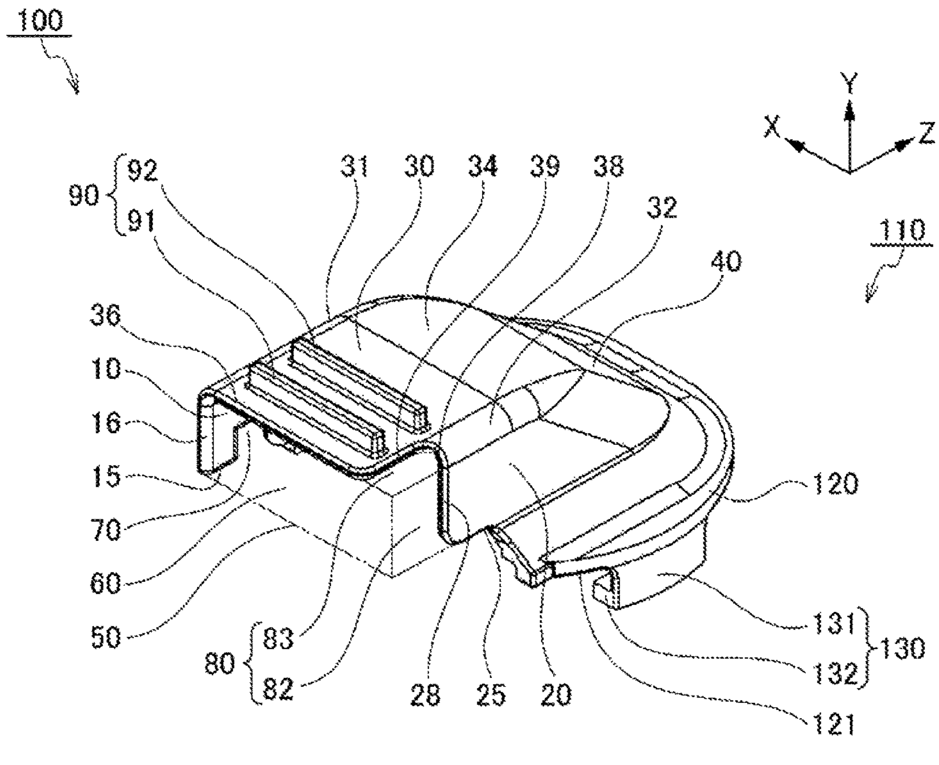
FIG. 6 is a perspective view for describing the wire cover for a connector according to the first embodiment of the invention.
Figure 7:
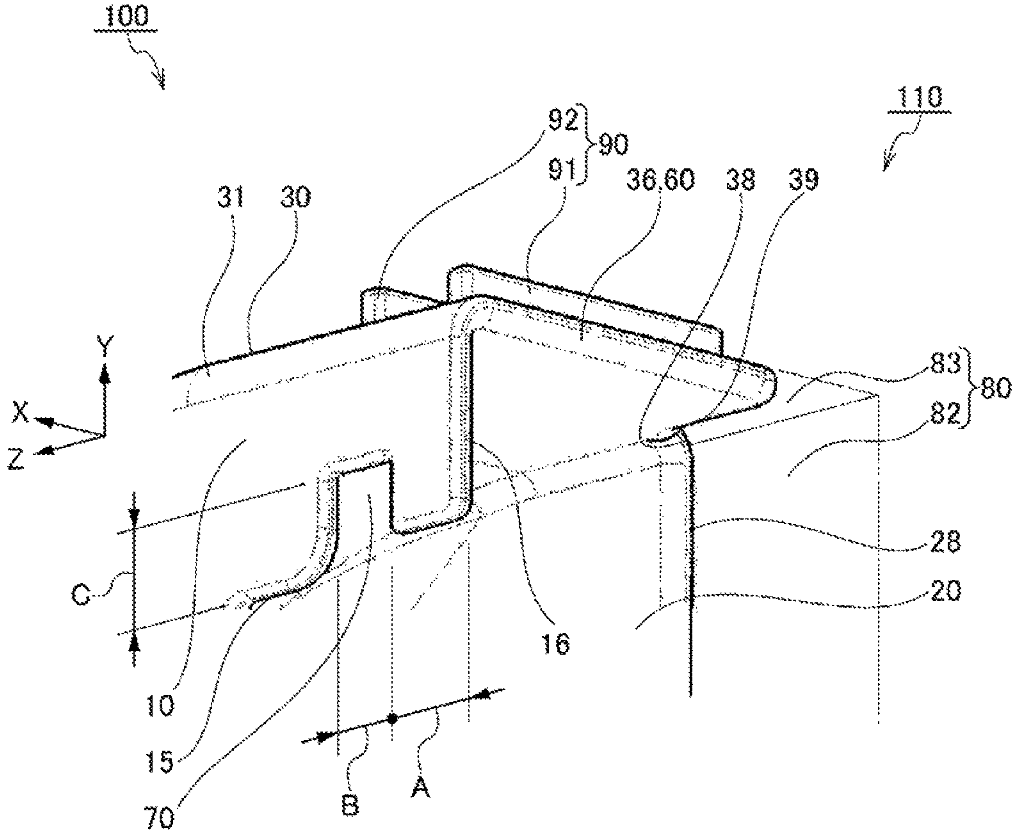
FIG. 7 is a partially enlarged perspective view illustrating the wire cover for a connector according to the first embodiment of the invention.

FIGS. 3 to 7 are views for describing the wire cover for a connector according to the first embodiment of the invention. FIG. 3 is a plan view, FIG. 4 is a front view, FIG. 5 is a side view. FIG. 6 is a perspective view, and FIG. 7 is a partially enlarged perspective view. Incidentally, for the convenience of explanation, the mounting direction (X direction, Y direction, and Z direction) defined in FIG. 1 is depicted additionally.

In FIGS. 1 to 7, the wire cover 100 is provided with a hood 110, a cover flange 120 which is connected to the hood 110, and a cover locking portion 130 which is provided in the cover flange 120. Hereinafter, these components will be described.

(Hood)

The hood 110 has almost a box shape which is provided with a connector facing aperture 50 (is the same as the surface in the −Y direction) which is open and a wire lead-out aperture 60 (is the same as the surface in the −Z direction) which is opened. When the hood 110 is attached to the connector 300, the connector facing aperture 50 faces the male connector housing 320, and the wire 210 is led out from the wire lead-out aperture 60 in the wire lead-out direction 101 (see FIG. 10).

The hood 110 is provided with a hood top surface 30 (is the same as the surface in the Y direction) which faces the connector facing aperture 50. The hood top surface 30 has almost a rectangular shape and provided with a first hood ridge line 31 and a second hood ridge line 32 which are in parallel to the wire lead-out direction 101 and have almost an arc shape in cross-sectional view, a hood back ridge line 34 which is perpendicular to the wire lead-out direction 101 and has almost an arc shape in cross-sectional view, and a hood top surface tip-edge 36 on the wire lead-out aperture 60 side.

The hood 110 is provided with a first hood side surface 10 and a second hood side surface 20 which are in parallel to the wire lead-out direction 101 (parallel to the Y-Z plane) and is smoothly connected to the first hood ridge line 31 and the second hood ridge line 32 respectively so as to extend from the hood top surface 30, and a hood rear slope 40 which is smoothly connected to the hood back ridge line 34, the first hood side surface 10, and the second hood side surface 20, and is inclined to approach the wire lead-out aperture 60 while being away from the connector facing aperture 50.

A hood side notched groove 70 (to be described below) is formed on the first hood side surface 10, a hood deficient surface 80 (to be described below) is formed to cross over the second hood side surface 20 and the hood top surface 30, and thus the shape of the hood 110 is asymmetrical.

Incidentally, the hood top surface 30 has been described as a flat plate shape parallel to the connector facing aperture 50, and the hood rear slope 40 is connected to the hood top surface 30 and the like, but the invention is not limited thereto. For example, the hood 110 may not be provided with the hood rear slope 40 and a hood top surface rib 90. Alternatively, the hood top surface 30 may have an arch shape (a cylinder or a partially conical shape), or the hood top surface 30 may be not in parallel with respect to the connector facing aperture 50. The point is that the hood top surface 30 may have a shape facing the lead-out wire 210.

(Hood Side Notched Groove)

The first hood side surface 10 is provided with a rectangular hood side notched groove 70 with width B at a distance A from the edge (is the same as the surface positioned in the surface where the hood top surface tip-edge 36. Hereinafter, referred to as "first hood side surface tip-edge") 16 on the wire lead-out aperture 60 side in a direction (Z direction) toward the hood rear slope 40, and with depth C notched from a side edge (hereinafter, referred to as "first hood side surface side-edge) 15 on the connector facing aperture 50 side toward the first hood ridge line 31 positioned at a base end (in the Y direction) while leaving the first hood ridge line 31.

Incidentally, the hood side notched groove 70 is formed to allow a band portion 410 of a binding band 400 (to be described below) to pass therethrough, and not to allow a head portion 420 of the binding band 400 to pass therethrough (see FIG. 8).

(Hood Deficient Surface)

A range of a distance D near the wire lead-out aperture 60 of the second hood side surface 20 is deficient (a state that all the area from the tip edge positioned in an extending direction of the second hood side surface 20 to the base end is not present), and a hood side deficient portion 82 (schematically illustrated by a two-dot chain line in FIGS. 3 and 6) is formed.

In other words, an edge (is the same as the edge on the wire lead-out aperture 60 side, and hereinafter referred to as "second hood side surface deficient edge") 28 on the hood side deficient portion 82 side of the second hood side surface 20 is at a position near the hood rear slope 40 instead of the wire lead-out aperture 60 from the hood top surface tip-edge 36 (is the same as the first hood side surface tip-edge 16).

In the hood top surface 30, a range of a distance E from the second hood side surface 20 in the X direction is deficient in the distance D from the hood top surface tip-edge 36 in the Z direction (a state that a part near the second hood side surface 20 is deficient), and a hood top deficient portion (schematically illustrated by a two-dot chain line in FIGS. 3 and 6) 83 is formed.

An edge forming the hood top deficient portion 83 parallel to the hood top surface tip-edge 36 is called "hood top surface deficient edge 38", and a side edge forming the hood top deficient portion 83 perpendicular to the hood top surface tip-edge 36 is called "hood top surface deficient side-edge 39". Incidentally, the hood top surface deficient side-edge 39 may be positioned in the second hood ridge line 32.

In other words, the hood top deficient portion 83 and the hood side deficient portion 82 are continuous, and the hood deficient surface 80 is formed by these two portions.

At this time, the distance D in the Z direction of the hood deficient surface 80 becomes equal to a sum of the distance A corresponding to a distance from the first hood side surface tip-edge 16 of the hood side notched groove 70 and a width B (D=A+B), or slightly larger than the sum (D>(A+B)). The distance E in the X direction of the hood deficient surface 80 is set to be larger than a thickness T (see FIG. 8) of the band portion 410 of the binding band 400 (to be described below) (E>T).

(Hood Top Surface Rib)

The hood top surface rib 90 is provided in the surface (a surface in the Y direction which is on the opposite side to the surface facing the wire 210 in the hood top surface 30) on the opposite side to the connector facing aperture 50 of the hood top surface 30 to be parallel to the hood top surface tip-edge 36. At this time, the hood top surface rib 90 is configured by a front hoop top surface rib 91 on the hoop top surface tip-edge 36 side and a rear hoop top surface rib 92 on the hood back ridge line 34 side which are disposed in parallel to each other.

A distance F in the Y direction from the hood top surface tip-edge 36 of the surface of the front hood top surface rib 91 facing the rear hood top surface rib 92 is almost the same as the distance A (F≅A), and a gap (a distance in the Y direction) G between the facing surfaces between the front hood top surface rib 91 and the rear hood top surface rib 92 is almost the same as the width B (G≅B). Therefore, the band portion 410 of the binding band 400 (to be described below) (see FIG. 8) is intruded to the hood side notched groove 70, and guided in a range interposed between the front hood top surface rib 91 and the rear hood top surface rib 92 in a state of being parallel to the hood top surface tip-edge 36, and then passes through the hood deficient surface 80.

Incidentally, the hood top surface rib 90 in the invention is not limited to the structure that the front hood top surface rib 91 and the rear hood top surface rib 92 both are provided, and may be provided with any one. The band portion 410 is guided into the hood side notched groove 70, and thus the hood top surface rib 90 may be removed. The hood top surface rib 90 is not limited to be parallel to the hood top surface tip-edge 36, and may be provided in a direction crossing the wire lead-out direction 101.

(Cover Flange)

The cover flange 120 has a horse-shoe shape having an almost arc portion which is almost the same as the outline of the male connector housing 320, and is provided with a cover flange end surface 121 abutting on the end surface 324 of the male connector housing 320, and the cover locking portion 130 which are provided in each of the side edges (the side edge in the X direction and the side edge in the −X direction) facing to each other in the cover flange end surface 121.

The cover locking portion 130 is intruded to the positioning groove 321 of the male connector housing 320, and is locked to the positioning projection 311 of the female connector housing 310 which is similarly intruded to the positioning groove 321.

In other words, the cover locking portion 130 is provided with a cover locking vertical portion 131 which is perpendicular (parallel to the Y-Z plane) to the cover flange end surface 121, and a cover locking parallel portion 132 which is continuous to the tip end of the cover locking vertical portion 131 and in parallel to the cover flange end surface 121 (parallel to the X-Z plane). The positioning projection 311 of the female connector housing 310 is intruded to a space of which three sides are surrounded by the cover flange end surface 121, the cover locking vertical portion 131, and the cover locking parallel portion 132 (see FIG. 9).

(Binding Band)

Figure 8:
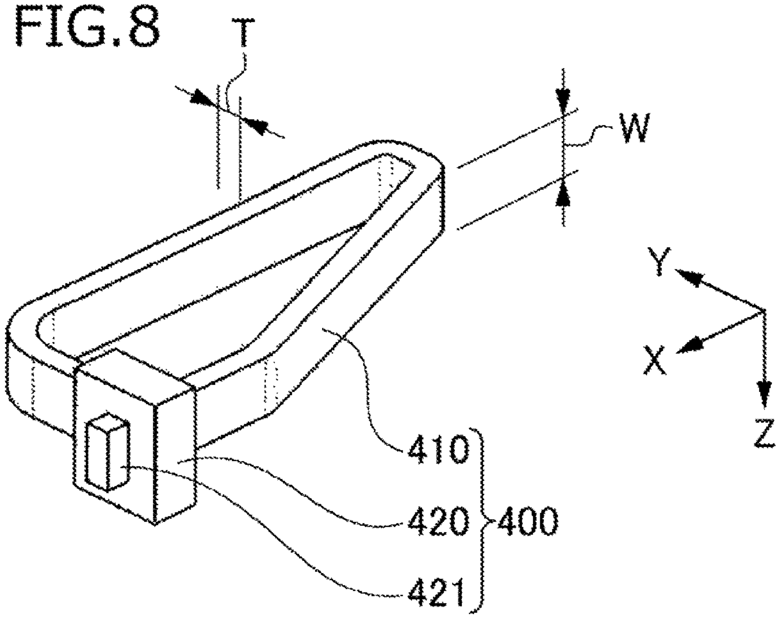
FIG. 8 is a perspective view for describing the wire cover for a connector according to the first embodiment of the invention, illustrating a binding band which is mounted.

FIG. 8 is a perspective view for describing the wire cover for a connector according to the first embodiment of the invention, illustrating the binding band which is mounted. Incidentally, for the convenience of explanation, the mounting direction (X direction, Y direction, and Z direction) defined in FIG. 1 is depicted additionally.

In FIG. 8, the binding band 400 is provided with the flexible band portion 410 and the head portion 420 where a binding hole 421 is formed. Irregularities (not illustrated) of a serrated shape in cross-sectional view are formed in the band portion 410, and claw-shaped projections (not illustrated) which are locked in the irregularities to constrain the movement in one direction are formed in the binding hole 421. Therefore, the band portion 410 can be inserted to the binding hole 421 from the tip end on the opposite side to the head portion 420, but is not detachable once being inserted.

Incidentally, the band portion 410 has a rectangular shape such that the cross section in the claw-shaped projection (not illustrated) has a width W (in the Z direction) and a thickness T (in the X or Y direction).

(Mounted State of Binding Band)

Figure 9:
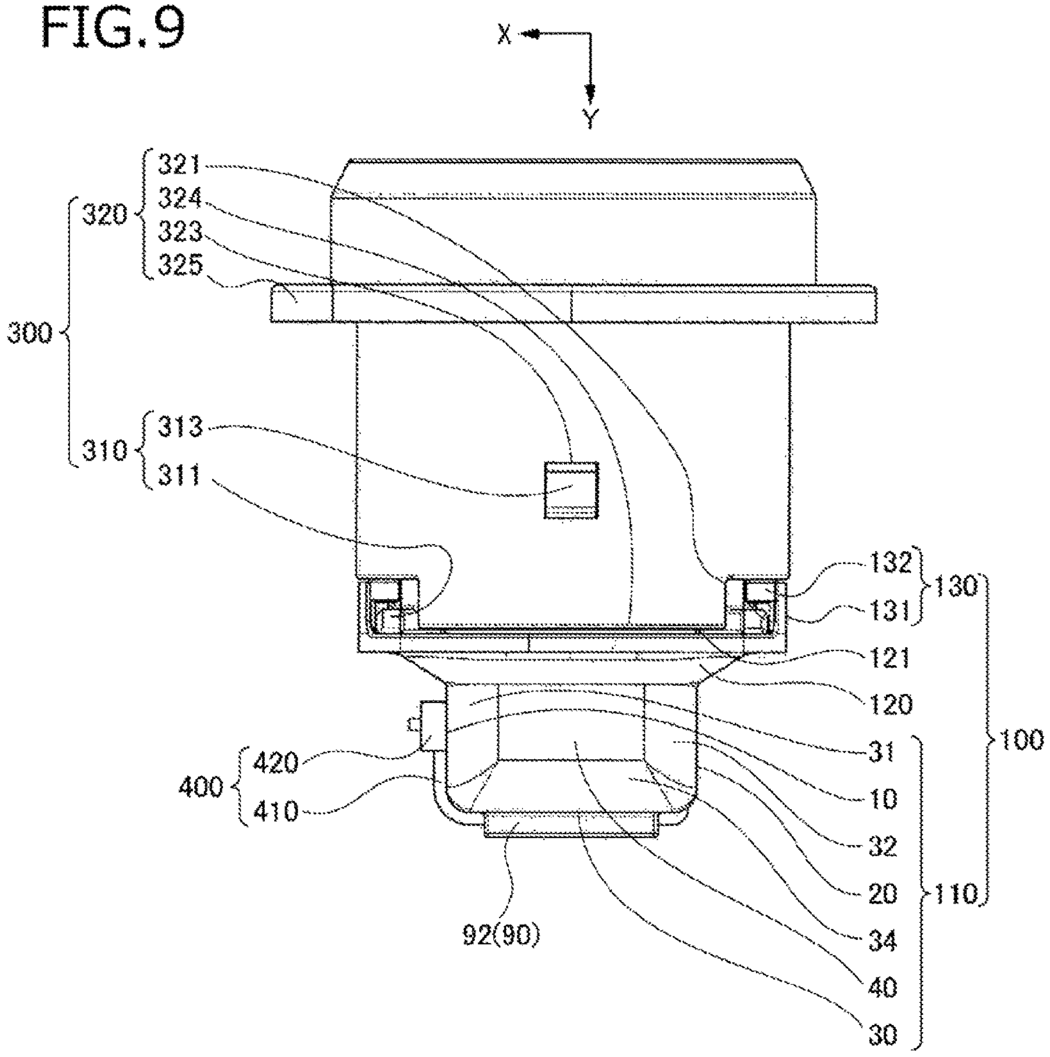
FIG. 9 is a plan view for describing the wire cover for a connector according to the first embodiment of the invention, illustrating a mounted state of the binding band.
Figure 10:
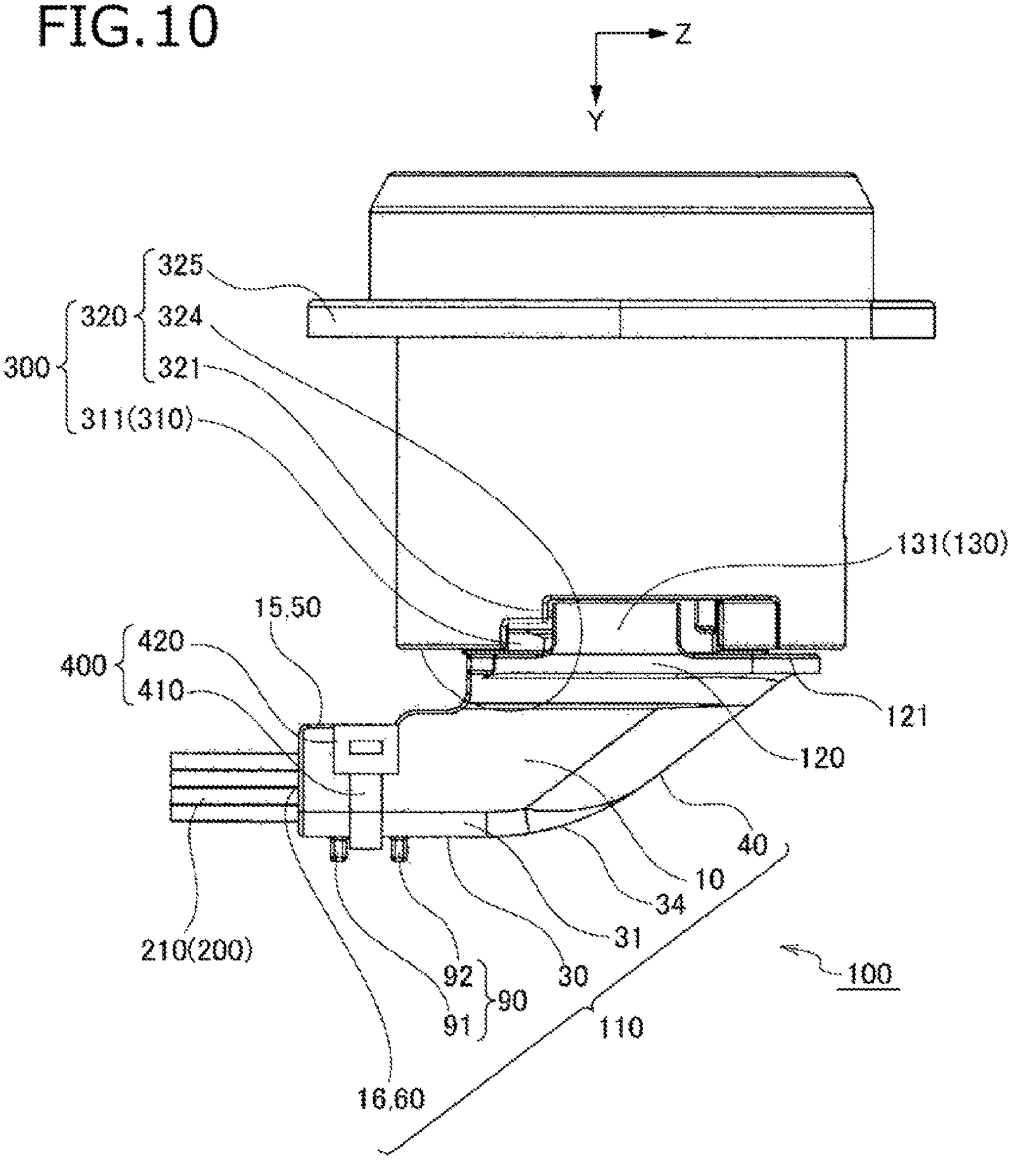
FIG. 10 is a side view for describing the wire cover for a connector according to the first embodiment of the invention, illustrating the mounted state of the binding band.
Figure 11:
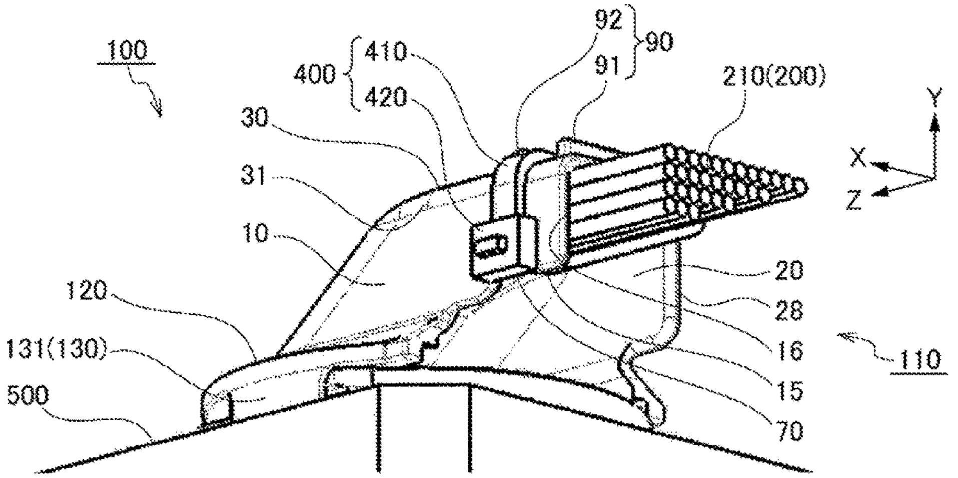
FIG. 11 is a partially enlarged perspective view for describing the wire cover for a connector according to the first embodiment of the invention, illustrating the mounted state of the binding band.
Figure 12:
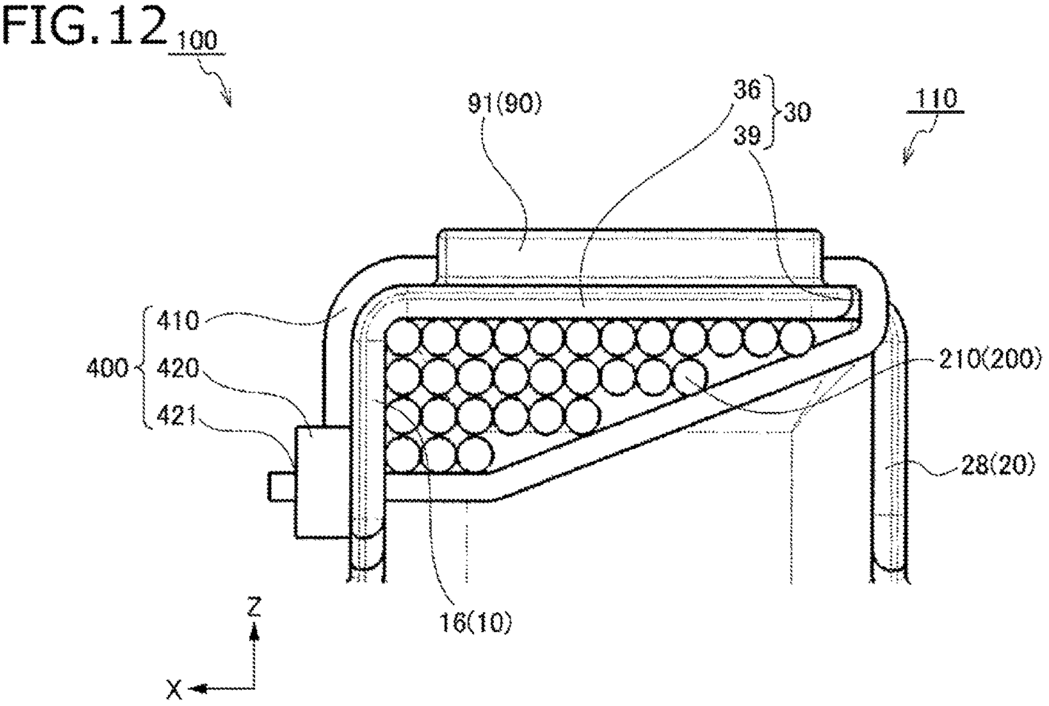
FIG. 12 is a partially enlarged front view for describing the wire cover for a connector according to the first embodiment of the invention, illustrating the mounted state of the binding band (thirty poles).
Figure 13:
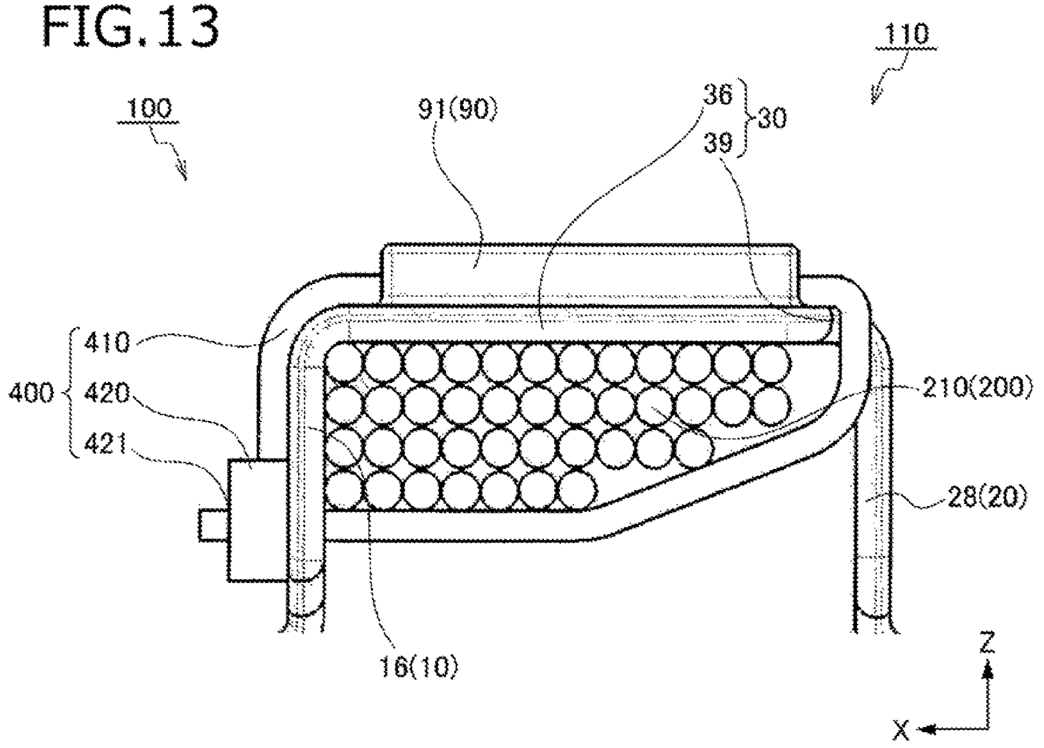
FIG. 13 is a partially enlarged front view for describing the wire cover for a connector according to the first embodiment of the invention, illustrating the mounted state of the binding band (forty-one poles).

FIGS. 9 to 13 are views for describing the wire cover for a connector according to the first embodiment of the invention. FIG. 9 is a plan view illustrating a mounted state of the binding band. FIG. 10 is a side view illustrating the mounted state of the binding band. FIG. 11 is a partially enlarged perspective view illustrating the mounted state of the binding band. FIG. 12 is a partially enlarged front view illustrating the mounted state of the binding band (thirty poles). FIG. 13 is a partially enlarged front view illustrating the mounted state of the binding band (forty-one poles). Incidentally, for the convenience of explanation, the mounting direction (X direction, Y direction, and Z direction) defined in FIG. 1 is depicted additionally.

In FIGS. 9 to 13, the wire cover 100 is attached to the connector 300, and the wire 210 led out from the wire cover 100 in the wire lead-out direction 101 is fixed to the wire cover 100 by the binding band 400.

The female connector housing 310 is stored in the male connector housing 320, the locking projection 313 of the former is locked in the locking hole 323 of the latter, and the positioning projection 311 of the former is intruded to the positioning groove 321 of the latter. In other words, the female connector housing 310 and the male connector housing 320 is integrated.

The cover flange end surface 121 of the wire cover 100 abuts on the end surface 324 of the male connector housing 320, and the cover locking portion 130 is intruded to the positioning groove 321 of the male connector housing 320. At this time, the positioning projection 311 of the female connector housing 310 is positioned in the space of which three sides are surrounded by the cover flange end surface 121, the cover locking vertical portion 131, and the cover locking parallel portion 132, and the cover locking portion 130 is fixed to the positioning projection 311 in a undetachable manner by a fixing member (not illustrated).

After being led out from the female connector housing 310 in the Y direction, the wire 210 of the connector terminal 200 is bent to the wire lead-out direction 101 side (−Z direction) in the hood rear slope 40 or the hood top surface 30 (not illustrated), is guided by the first hood side surface 10, the hood top surface 30, and the second hood side surface 20, and is led out from the wire lead-out aperture 60 in the wire lead-out direction 101.

The band portion 410 of the binding band 400 is guided to the hood side notched groove 70 and the hood top surface rib 90, and passes through the hood deficient surface 80. Then, the wire 210 is fixed to the wire cover 100. At this time, the head portion 420 of the binding band 400 is pressed to the periphery of the hood side notched groove 70 of the first hood side surface 10, and the band portion 410 is fastened.

(Operational Effects)

(a) As described above, the binding band 400 passes through the hood deficient surface 80 in a state where the band portion 410 is guided to the hood side notched groove 70 and the hood top surface rib 90. In other words, the hood 110 has no hole corresponding to the insertion hole (see Patent Document 1) for inserting the band portion 410, and the band portion 410 can be mounted only by being wound to the hood 110, so that the work can be done with speed.

(b) The binding band 400 is prevented from being deviated since the band portion 410 is guided to the hood side notched groove 70 and the hood top surface rib 90, and the binding band 400 is fastened in a stable state where the head portion 420 is pressed to the periphery of the hood side notched groove 70 of the first hood side surface 10. Therefore, a binding work of the binding band 400 is stabilized, so that the binding band 400 is fastened sufficiently, and the wire 210 is securely fixed to the wire cover 100.

(c) Since the band portion 410 is flexible and can pass through the hood deficient surface 80, the wire 210 can be fixed to the wire cover 100 without being affected by the number of wires 210 to be led out. In other words, in a case where the number of wires 210 is less (for example, thirty poles), the band portion 410 has almost a triangular shape in front view (see FIG. 12). In a case where the number of wires 210 is large (for example, forty-one poles), the band portion 410 has almost a trapezoidal shape in front view (see FIG. 13). In any case, the band portion 410 can be securely fastened.

(d) A deficient range of the hood top deficient portion 83 of the hood deficient surface 80 is a range of the distance E from the second hood side surface 20 in a direction toward the first hood side surface 10 including a part of the second hood ridge line 32, in which the distance E is larger than a thickness T of the band portion 410 (E>T). Therefore, in a state where the binding band 400 fixes the wire 210 to the wire cover 100, the band portion 410 passes through the hood deficient surface 80, settled at a position near the first hood side surface 10 from the second hood side surface 20, and thus does not protrude from the second hood side surface 20 in the opposite direction (−X direction) to the first hood side surface 10. Therefore, a space having no protruding stuff is formed along the second hood side surface 20.

(State of Use)

Figure 14:
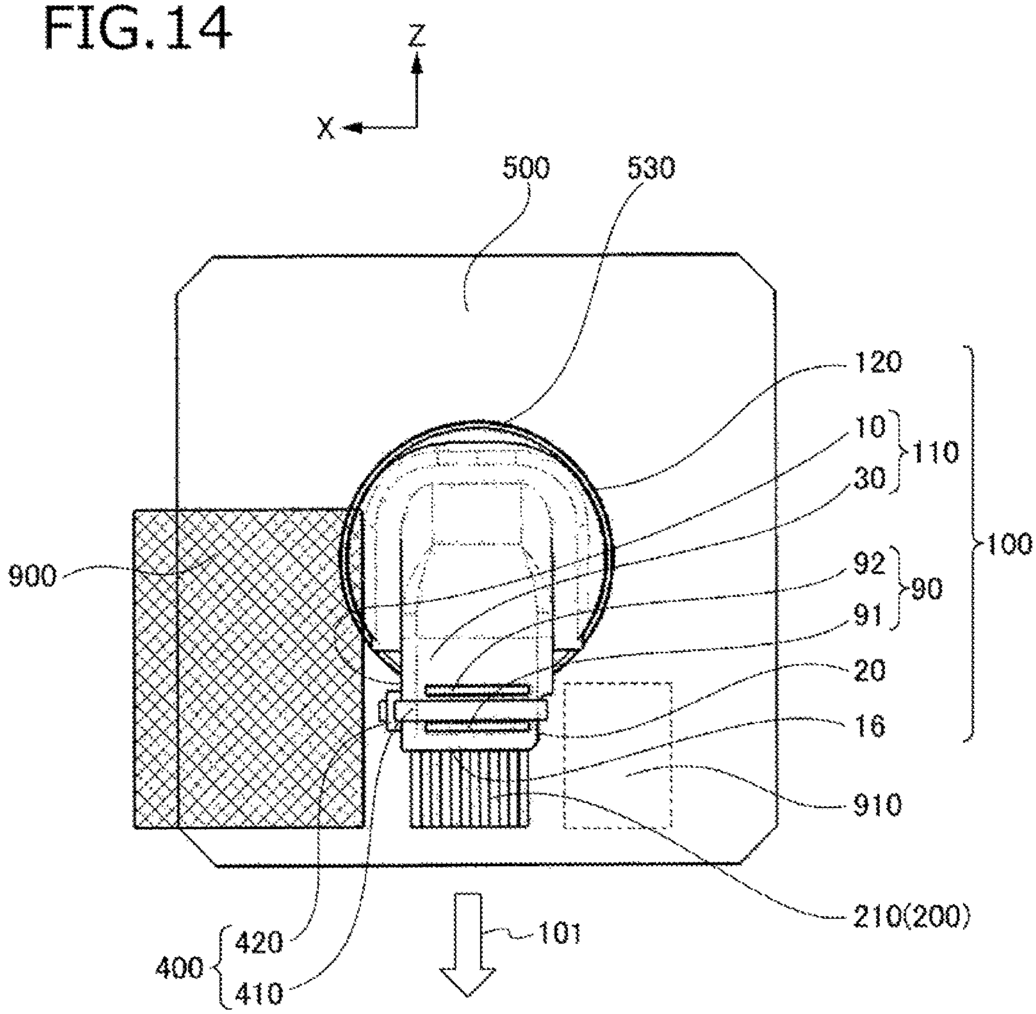
FIG. 14 is a plan view for describing the wire cover for a connector according to the first embodiment of the invention, illustrating a state of use.
Figure 15:
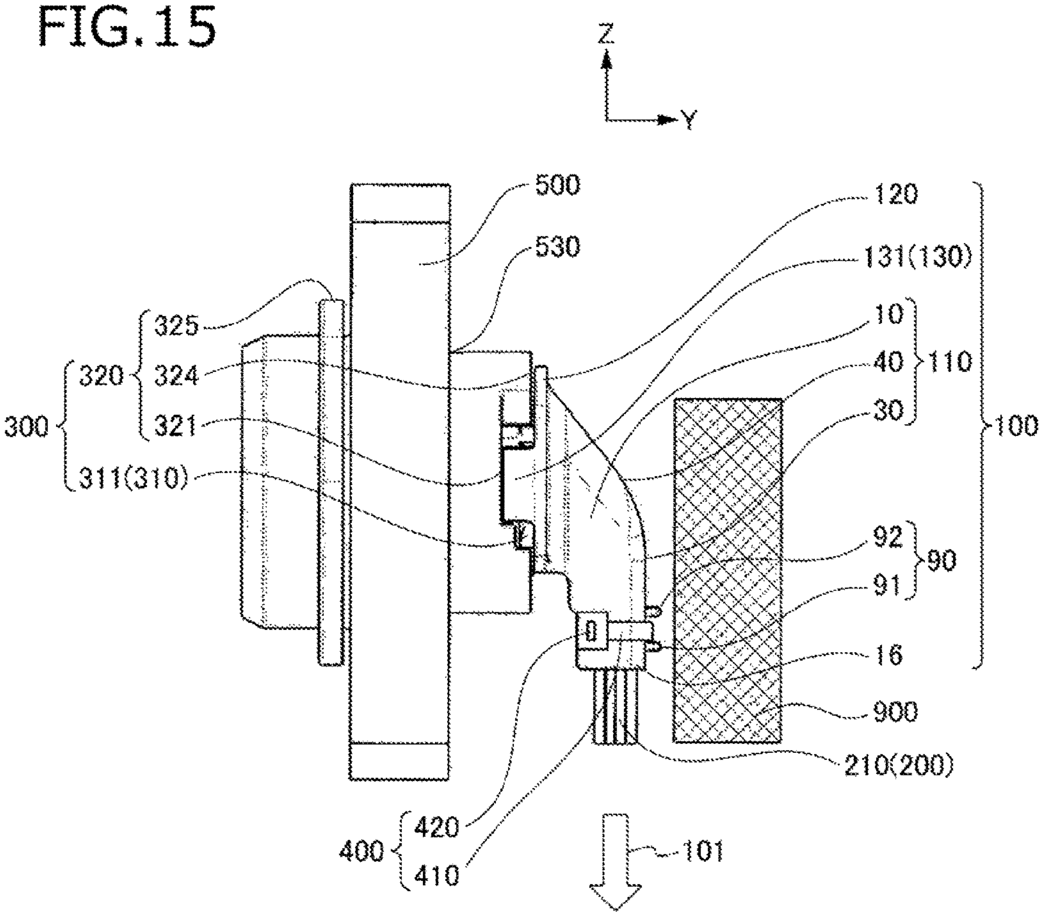
FIG. 15 is a side view for describing the wire cover for a connector according to the first embodiment of the invention, illustrating a state of use.
Figure 16:
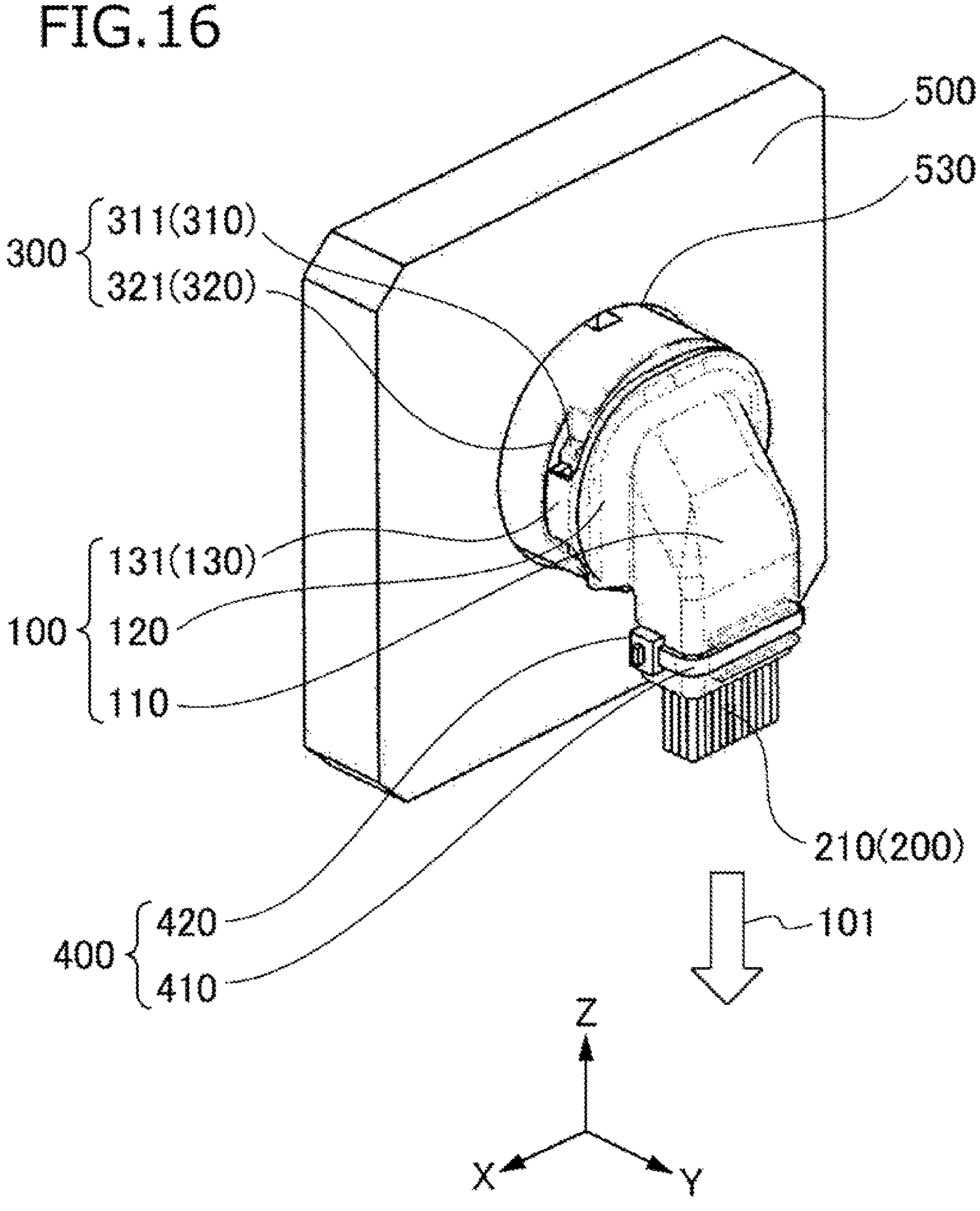
FIG. 16 is a perspective view for describing the wire cover for a connector according to the first embodiment of the invention, illustrating a state of use.

FIGS. 14 to 16 are views for describing the wire cover for a connector according to the first embodiment of the invention. FIG. 14 is a plan view illustrating a state of use, FIG. 15 is a side view illustrating the state of use, and FIG. 16 is a perspective view illustrating the state of use. Incidentally, for the convenience of explanation, the mounting direction (X direction, Y direction, and Z direction) defined in FIG. 1 is depicted additionally.

In FIGS. 14 to 16, the connector 300 is mounted to an automatic transmission case (hereinafter, referred to as "A/M") 500 of a vehicle. Incidentally, FIGS. 14 to 16 schematically illustrate a part of the A/M 500 using a rectangular plate.

In other words, the connector 300 passes through an installation hole 530 provided in the A/M 500, and is fixed to the A/M 500 by a fixing member (not illustrated). The wire cover 100 is attached to the connector 300, and the binding band 400 fixes the wire 210 to the wire cover 100.

At this time, as described above, the wire 210 led out in the wire lead-out direction 101 is securely fixed to the wire cover 100 by the binding band 400 with a simply work. Therefore, the led-out wire 210 is prevented from an interference with a device or a member (hereinafter, referred to as "other peripheral component 900") disposed in the vicinity of the connector 300 of the A/M 500.

Since the band portion 410 passes through the hood deficient surface 80 and does not protrude to the outside of the second hood side surface 20, a space (surrounded by a broken line as schematically illustrated in FIG. 14, and hereinafter, referred to as "peripheral space 910") having no protruding stuff is formed along the second hood side surface 20. Therefore, it is possible to dispose the other peripheral components 900 in the peripheral space 910, so that the other peripheral components 900 can be disposed with a lot of flexibility.

Second Embodiment

A mode (hereinafter, referred to as "second embodiment") for carrying out the invention will be described with reference to the drawings. Incidentally, the same portions as those of the first embodiment or the corresponding portions will be assigned with the same name and the same symbol, and the description thereof will be omitted partially.

Figure 17:
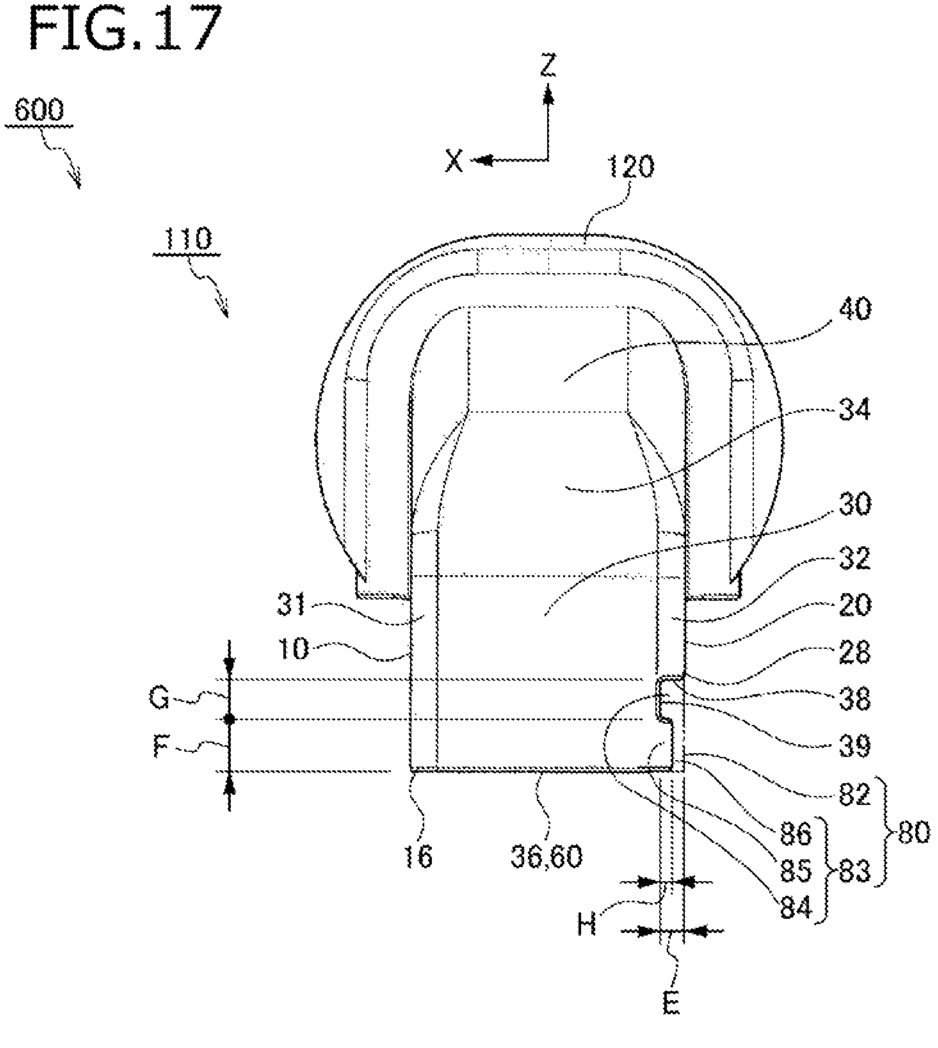
FIG. 17 is a plan view for describing a wire cover for a connector according to a second embodiment of the invention.
Figure 18:
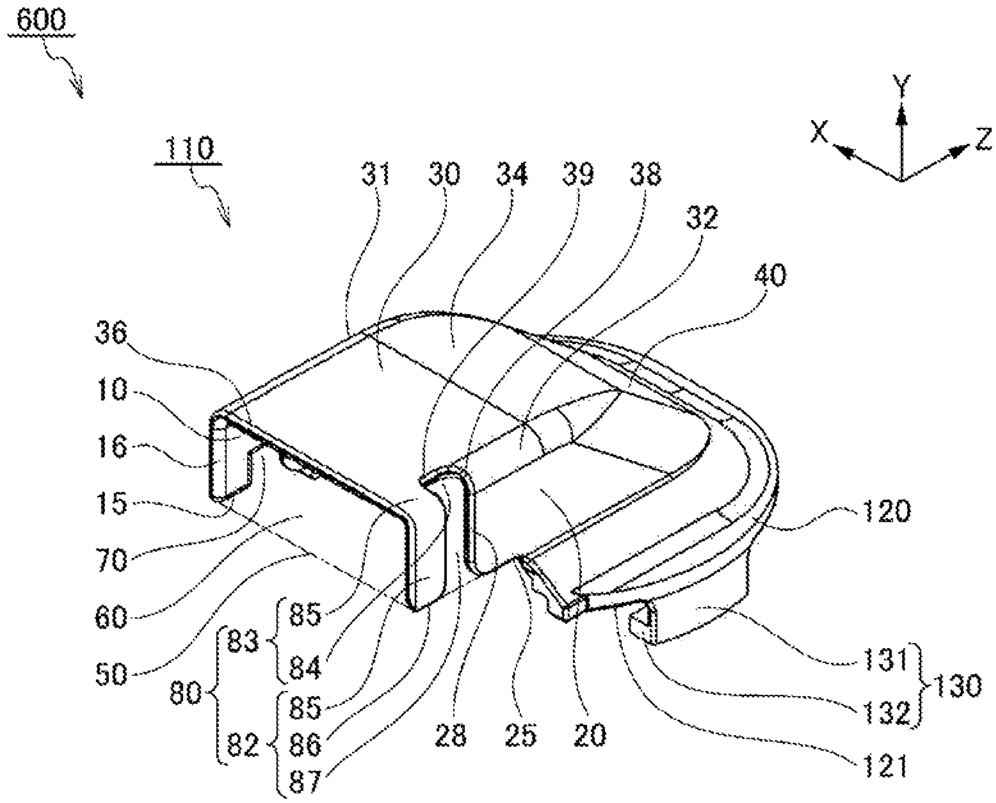
FIG. 18 is a perspective view for describing a modification example of the wire cover of a connector according to the second embodiment of the invention.

FIGS. 17 and 18 are views for describing the wire cover for a connector according to the second embodiment of the invention. FIG. 17 is a plan view, and FIG. 18 is a perspective view illustrating a modification example.

In FIG. 17, a wire cover for a connector (hereinafter, referred to "wire cover") 600 is provided with a hood top surface notched groove 84 in the hood top deficient portion 83 instead of the hood top surface rib 90 from the wire cover 100 illustrated in the first embodiment.

In other words, a protruding member is not provided in the surface on the opposite side to the connector facing aperture 50 of the hood top surface 30.

The hood top deficient portion 83 is formed with the hood top surface notched groove 84 with width G at the distance F from the hood top surface tip-edge 36 in a direction (Z direction) toward the hood rear slope 40 in a rectangular shape from the hood top surface deficient side-edge 39 toward the hood side deficient portion 82 (toward the −X direction). In other words, in the hood top surface 30, a range of width F along the hood top surface tip-edge 36 is extended toward the hood side deficient portion 82. As a result, the hood top surface 30 and the second hood side surface 20 are formed to surround the hood side deficient portion 82 and the hood top deficient portion 83.

Therefore, such an extension is called "hood top surface extension 85", and an edge perpendicular to the hood top surface tip-edge 36 of the hood top surface extension 85 is called "hood top surface extension side-edge 86". The hood top surface notched groove 84 is a range obtained by removing the hood top surface extension 85 from the hood top deficient portion 83. Incidentally, the hood top surface extension side-edge 86 may be positioned within a virtual plane containing the second hood ridge line 32.

Since the edge perpendicular to the hood top surface tip-edge 36 indicating the bottom of the hood top surface notched groove 84 is the hood top surface deficient side-edge 39, an actual depth H of the hood top surface notched groove 84 is the same as the distance between the hood top surface deficient side-edge 39 and the hood top surface extension side-edge 86. The band portion 410 of the binding band 400 is set to be locked in the −Z direction in an immovable way.

(Operational Effects)

Therefore, the hood top surface notched groove 84 guides the band portion 410 similarly to the hood top surface rib 90 in the wire cover 100 (first embodiment), and thus the wire cover 600 obtains the similar operational effects (a) to (d) to the wire cover 100. Further, since there is no portion corresponding to the hood top surface rib 90, a space having no protruding stuff is formed in the opposite direction to the connector facing aperture 50 of the hood top surface 30.

Modification Examples

In FIG. 18, the hood top surface extension 85 is extended into the hood side deficient portion 82, and a second hood side surface notched groove 87 continuous to the hood top surface notched groove 84 is formed in the hood side deficient portion 82.

At this time, the hood top surface extension 85 includes a range of a virtual plane containing the first hood ridge line 31, and a range of a virtual plane containing the second hood side surface 20. In other words, the second hood side surface notched groove 87 is a range obtained by subtracting the range of the virtual plane containing the second hood side surface 20 of the hood top surface extension 85 from the hood side deficient portion 82.

Incidentally, the hood top surface extension side-edge 86 may be not positioned on a virtual line containing a second hood side surface side-edge 25 (is the same as the side edge on the connector facing aperture 50 side of the second hood side surface 20).

Herein, the features of the embodiments of the wire cover for a connector according to the invention will be simply summarized as the following [1] to [4].

[1] A wire cover for a connector (wire cover 100) which is configured to be attached to the connector (female connector housing 310), and guides a wire (210) led out from the connector in a wire lead-out direction (101), includes:

a hood top surface (30) which faces the led-out wire; and a first hood side surface (10) and a second hood side surface (20) which extend from the hood top surface toward the connector in a direction substantially parallel to the wire lead-out direction.

A hood side notched groove (70) is formed in the first hood side surface so as to be notched from a tip edge (first hood side surface side-edge 15) positioned in an extending direction of the first hood side surface toward a base end (hood ridge line 31) of the first hood side surface while leaving the base end.

A hood side deficient portion (82) is formed in the second hood side surface, the hood side deficient portion (82) is deficient extending from a tip edge (second hood side surface side-edge 25) positioned in an extending direction of the second hood side surface to a base end (second hood ridge line 32) of the second hood side surface.

A hood top surface deficient portion (83) is formed in the hood top surface and is partially deficient of the hood top surface positioned near the second hood side surface, and the hood top surface deficient portion (83) being adjacent to the hood side deficient portion.

[2] The wire cover for the connector according to [1], wherein in the hood top surface, a hood top surface rib (90) is formed in a surface being opposite side to a surface facing the wire along a direction crossing the wire lead-out direction.

[3] The wire cover for the connector according to [1], wherein the hood top surface and the second hood side surface are formed to surround the hood side deficient portion and the hood top deficient portion, and wherein the hood side notched groove and the hood side deficient portion are formed to face each other.

[4] The wire cover for the connector according to any one of [1] to [3], further includes:

a binding band (400) which includes a flexible band portion (410), and a head portion (420) having a binding hole (421) through which the band portion passes in an undetachable manner.

The band portion is guided to the hood side notched groove, and passes through the hood side deficient portion and the hood top deficient portion.

The head portion abuts on a periphery of the hood side notched groove.

The invention has been described in detail or with reference to specific embodiments, and it is deemed that a person skilled in the art could easily conceive that various modifications and changes may be made within a scope not departing from the spirit of the invention.

This application is based on Japanese Patent Application (Japanese Patent Application NO. 2015-241790) filed on Dec. 11, 2015, the contents of which are incorporated herein by reference.

INDUSTRIAL APPLICABILITY

As described above, since a binding work of the binding band is stabilized, thereby fixing a wire securely, the wire cover for the connector according to the invention can be used widely as a cover to restrict a lead-out direction from various types of devices of various flexible cords and various types of pipe bodies.

REFERENCE SIGNS LIST

10: first hood side surface
15: first hood side surface side-edge
16: first hood side surface tip-edge
20: second hood side surface
25: second hood side surface side-edge
28: second hood side surface deficient edge
30: hood top surface
31: first hood ridge line
32: second hood ridge line
34: hood back ridge line
36: hood top surface tip-edge
38: hood top surface deficient edge
39: hood top surface deficient side-edge
40: hood rear slope
50: connector facing aperture
60: wire lead-out aperture
70: hood side notched groove
80: hood deficient surface
82: hood side deficient portion
83: hood top deficient portion
84: hood top surface notched groove
85: hood top surface extension
86: hood top surface extension side-edge
87: second hood side surface notched groove
90: hood top surface rib
91: front hood top surface rib
92: rear hood top surface rib
100: wire cover for connector (wire cover, first embodiment)
101: wire lead-out direction
110: hood
120: cover flange
121: cover flange end surface
130: cover locking portion
131: cover locking vertical portion
132: cover locking parallel portion
200: connector terminal
201: connector terminal insertion direction
210: wire
220: crimp terminal
300: connector
301: housing insertion direction
310: female connector housing
311: positioning projection
312: connector terminal storage chamber
313: locking projection

320: male connector housing
321: positioning groove
323: locking hole
324: end surface
325: male connector flange
400: binding band
410: band portion
420: head portion
421: binding hole
500: automatic transmission case (AIM)
530: installation hole
600: wire cover for connector (wire cover, second embodiment)
900: other peripheral components
910: peripheral space

The invention claimed is:

1. A wire cover for a connector which is configured to be attached to the connector, and guides a wire led out from the connector in a wire lead-out direction, the wire cover comprising a hood top surface which faces the led-out wire; and a first hood side surface and a second hood side surface which are extended from the hood top surface toward the connector in a direction substantially parallel to the wire lead-out direction, wherein a hood side notched groove is formed in the first hood side surface so as to be notched from a tip edge positioned in an extending direction of the first hood side surface toward a base end of the first hood side surface while leaving the base end;

wherein a hood side deficient portion is formed in the second hood side surface, the hood side deficient portion is deficient extending from a tip edge positioned in an extending direction of the second hood side surface to a base end of the second hood side surface; and wherein a hood top surface deficient portion is formed in the hood top surface and is partially deficient of the hood top surface positioned near the second hood side surface, and the hood top surface deficient portion being adjacent to the hood side deficient portion.

2. The wire cover according to claim 1, wherein in the hood top surface, a hood top surface rib is formed on a surface being opposite side to a surface facing the wire along a direction crossing the wire lead-out direction.

3. The wire cover according to claim 1, wherein the hood top surface and the second hood side surface are formed to surround the hood side deficient portion and the hood top deficient portion; and wherein the hood side notched groove and the hood side deficient portion are formed to face each other.

4. The wire cover according to claim 1, further comprising:

a binding band which includes a flexible band portion, and a head portion having a binding hole through which the band portion passes in an undetachable manner, wherein the band portion is guided to the hood side notched groove, and passes through the hood side deficient portion and the hood top deficient portion; and wherein the head portion abuts on a periphery of the hood side notched groove.

* * * * *